(12) United States Patent
Simmons

(10) Patent No.: US 8,250,809 B2
(45) Date of Patent: Aug. 28, 2012

(54) APPARATUS FOR AEROPONICALLY GROWING AND DEVELOPING PLANTS

(76) Inventor: Robert Simmons, Indiantown, FL (US)

(*) Notice: Subject to any disclaimer, the term of this patent is extended or adjusted under 35 U.S.C. 154(b) by 0 days.

(21) Appl. No.: 12/846,467

(22) Filed: Jul. 29, 2010

(65) Prior Publication Data

US 2011/0061297 A1 Mar. 17, 2011

Related U.S. Application Data

(63) Continuation-in-part of application No. 12/584,773, filed on Sep. 11, 2009.

(51) Int. Cl.
*A01G 31/02* (2006.01)
(52) U.S. Cl. ..................................................... 47/62 N
(58) Field of Classification Search .............. 47/59 R, 47/60, 62 A, 62 N, 62 R, 79, 82, 83, 86, 87; D11/143
See application file for complete search history.

(56) References Cited

U.S. PATENT DOCUMENTS

| | | | | |
|---|---|---|---|---|
| 262,335 A | * | 8/1882 | Wagner | 47/83 |
| 297,932 A | * | 4/1884 | Groves | 47/82 |
| 1,322,803 A | * | 11/1919 | Macfadden | 237/56 |
| D207,915 S | * | 6/1967 | Zimmerman | D11/152 |
| 4,218,847 A | * | 8/1980 | Leroux | 47/59 R |
| 4,332,105 A | | 6/1982 | Nir | |
| 4,514,930 A | | 5/1985 | Schorr et al. | |
| 4,669,217 A | | 6/1987 | Fraze | |
| 4,813,176 A | | 3/1989 | Takayasu | |
| 4,869,019 A | | 9/1989 | Ehrlich | |
| 5,136,804 A | | 8/1992 | Rothem et al. | |
| 5,381,625 A | * | 1/1995 | Wente | 47/83 |
| 5,393,426 A | | 2/1995 | Raskin et al. | |
| 5,501,037 A | | 3/1996 | Aldokimov et al. | |
| 5,502,923 A | * | 4/1996 | Bradshaw | 47/62 A |
| 5,555,676 A | * | 9/1996 | Lund | 47/82 |
| 5,724,768 A | | 3/1998 | Ammann, Jr. et al. | |
| 5,876,484 A | | 3/1999 | Raskin et al. | |
| 6,000,173 A | | 12/1999 | Schow et al. | |
| 6,807,770 B2 | | 10/2004 | Wainwright et al. | |
| 2005/0198897 A1 | | 9/2005 | Wainright et al. | |
| 2005/0252080 A1 | | 11/2005 | Wright | |
| 2006/0053691 A1 | | 3/2006 | Harwood et al. | |
| 2006/0156624 A1 | | 7/2006 | Roy et al. | |
| 2006/0272210 A1 | | 12/2006 | Bissonnette et al. | |
| 2007/0113472 A1 | | 5/2007 | Plowman | |
| 2011/0061296 A1 | * | 3/2011 | Simmons | 47/62 A |
| 2011/0061297 A1 | * | 3/2011 | Simmons | 47/62 A |

OTHER PUBLICATIONS

Ziegler, Reinhold, "The Vertical Aeroponic Growing System," Synergy International Inc., www.synergyii.com, pp. 1-13.

* cited by examiner

*Primary Examiner* — Frank T Palo
(74) *Attorney, Agent, or Firm* — Steven M. Greenberg, Esq.; Carey Rodriguez Greenberg & O'Keefe, LLP

(57) ABSTRACT

A self-contained apparatus for aeroponically growing and developing plants that comprises a reservoir for containing a liquid nutrient solution, a conical tower, a power supply, and a pump to move the liquid nutrient solution through the apparatus. The apparatus utilizes a pump to move the liquid nutrient solution from the reservoir vertically to a distribution pipe. Gravity then pulls the liquid nutrient solution downward through the distribution pipe, which is sealed at the opposite end. The pressure created within the distribution pipe creates sufficient force to disperse the liquid nutrient solution through the opening(s) in the distribution pipe onto the exposed root mass. Once the nutrient solution has been dispersed into the conical tower it is absorbed by the exposed root mass. The un-absorbed liquid nutrient solution collects the in base of the conical tower and is returned to the reservoir to be reused.

8 Claims, 5 Drawing Sheets

APPARATUS FOR AEROPONICALLY GROWING AND DEVELOPING PLANTS

CROSS-REFERENCE TO RELATED APPLICATIONS

This application is a Continuation-In-Part of pending U.S. application Ser. No. 12/584,773 filed Sep. 11, 2009 in its entirety.

BACKGROUND OF THE INVENTION

The present invention relates to aeroponics and the growth and development of plants in a gaseous environment into which a liquid nutrient solution is introduced.

Prior to the expansion of aeroponic devices for the growth and development of plants, people experimented with hydroponics, which is a method of growing plants using mineral nutrient liquid solutions instead of soil. Hydroponics is said to provide healthier plants that grow faster than those grown in soil. Although in hydroponics plants are grown in the absence of soil, the roots are maintained in a liquid environment. Consequently, one of the reasons hydroponics is not widely accepted is because the lack of adequate ventilation at the roots from the continuous presence of water is a major cause of root disease.

To solve this problem, people turned to aeroponics. As generally known, aeroponics is the process of growing plants in an air or mist environment without the use of soil or an aggregate medium. One of the reasons why aeroponics has been in such high demand is because of the proliferation of disease, such as *Fussarium, Boytrytis, Sclerotium, Verticilium* and *Rhizoctonia*, among plants that are cultivated in soil and through hydroponics. Other difficulties that arise in cultivating plants grown in soil are the demand for specialized nutrients to enhance growth, and, more importantly, the need for land.

Therefore what is needed is an apparatus that more efficiently and effectively executes aeroponic principals in a given volume.

The present invention will be more fully understood and appreciated from the following detailed description taken in conjunction with the drawings.

SUMMARY OF THE INVENTION

An apparatus for aeroponically growing plants includes a reservoir. A pump is coupled to the reservoir. A conical tower is coupled to the reservoir. The conical tower has a first end and a second end, the first end including a nutrient feed and the second end being coupled to the reservoir. A first plant support and a second plant support are disposed along the conical tower. The first plant support has a first diameter and is disposed between the first end and the second plant support, the second plant support having a second diameter, the second diameter, greater than the diameter of the first plant support. Each plant support has at least one opening therein adapted to retain a seed container therein. The opening of the first plant support is offset from the position of the opening of the second plant support. Additionally, an anchor is provided on a surface of the plant support adjacent to the opening. The anchor is pivotably mounted on the plant support so as to move between a first position in which it extends across at least a portion of the opening and a second position where it is clear of the opening.

In another embodiment, the conical tower is formed as a plurality of plant supports. Each plant support has a first conical wall. A first planer surface extends down and away from the conical wall. A second surface extends downward from the conical wall and inward to form a body of the plant support. A second conical wall extending from the second panel forms a guide path for a liquid nutrient. The second conical wall has a length greater than the length of the first conical wall and an outer diameter less than the inner diameter of the first conical wall. In this way, the first conical wall receives and supports the second conical wall therein, while allowing the second conical wall to extend into the interior of the body of an adjacent plant support.

DETAILED DESCRIPTION OF A PREFERRED EMBODIMENT

Figure 1:
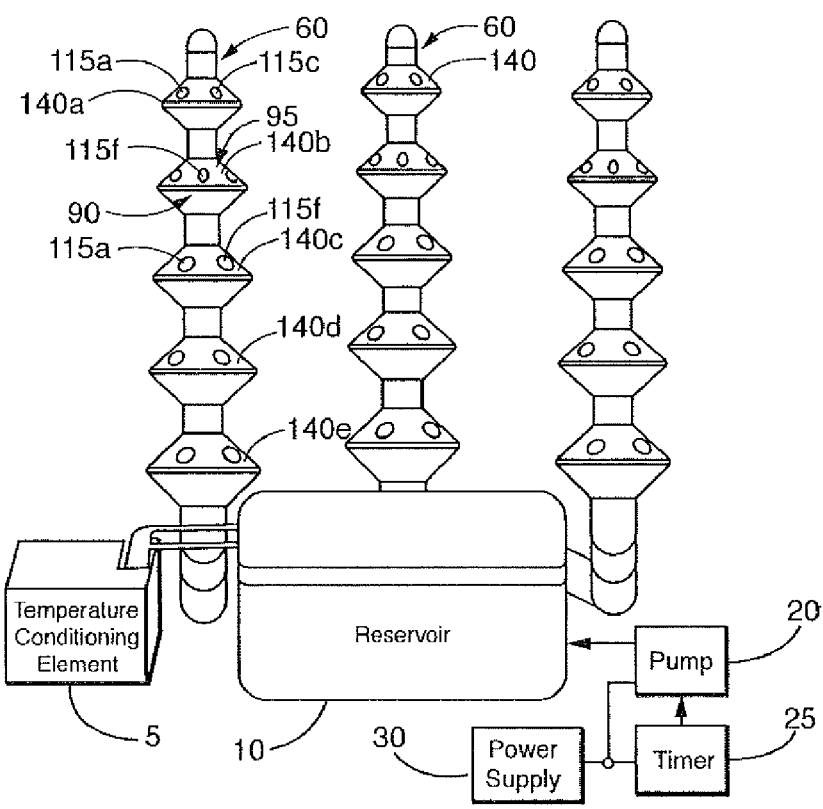
FIG. 1 illustrates a commercial aeroponic growth and development system constructed in accordance with the invention.

Nir, U.S. Pat. No. 4,332,105 discusses a method and an apparatus for aeroponically growing and developing multiple plants in which the plants are supported by a perforated plant support member adapted to secure plants above the root portions and expose the root portions to the atmosphere. A problem with Nir's invention as illustrated in U.S. Pat. No. 4,332,105 is that the growth and development units are rectangular and comprise a support frame having legs and a peripheral supporting structure mounted thereon. Therefore, the number of plants that can be cultivated is limited by the amount of land on which to put the horizontal development units. Additionally, if one attempts to stack the rectangular units to increase the amount of plants cultivated within a defined space, the amount of light received by the lower development units will be limited by the development units stacked on top, thereby negatively impacting the growth of the plants. However, the instant invention does not utilize rectangular plant development units. As will be appreciated from Applicant's invention, the conical shape of the tower and the offset spacing of the plants allows for a greater variety of plants, including longer living plants and those with a larger root mass to be grown at the same time. Similarly, the off-set spacing allows for the use of different size panels with openings that can be adopted to difference size plants. Moreover, the use of gravity allows the present invention to be used to grow a greater number of plants in a more cost effective, energy efficient, and environmentally friendly manner by not requiring expensive high pressure pumps to mist the exposed root mass of the plants.

Schorr et. al., U.S. Pat. No. 4,514,930 discusses the use of an intermittent nutrient delivery system, namely an apparatus and a method for the propagation of plants in an aeroponic environment through the use of an aqueous plant growth nutrient and hormone composition that is applied as an intermittent hydro-atomized mist to plant cuttings suspended in an enclosed chamber. One disadvantage of the invention as illustrated in U.S. Pat. No. 4,514,930 is the need for a supply of tap water at standard or common tap pressure to create the necessary suction to draw the measured amount of nutrient, hormone or other solution from different containers to cultivate the plants. Said nutrients, hormones, and plant growth promoting compositions are housed in separate containers connected by appropriate conduits with check valves. Therefore, without the suction created by the tap water pressure the plants would not receive the required nutrients. Further, after a measured length of time, the flow of tap water is shut off and the system is drained. The instant invention, however, does not require constant water pressure from a standard tap source to introduce and mix the nutrient solution, since Applicant's apparatus is a self contained system. Further, as will be appreciated in Applicant's invention, the apparatus does not have to be drained after each cycle. Instead the liquid nutrient solution utilized in Applicant's invention collects in the base and is returned to the reservoir to be reused.

Ehrlich, U.S. Pat. No. 4,869,019, discusses the use of a self contained aeroponic system comprising a reservoir for containing a nutrient solution. U.S. Pat. No. 4,869,019 illustrates a self-contained aeroponic apparatus in which the plant support is right-angular in vertical cross-section, including a vertical back wall and a hypotenuse front wall having the tubular cups. With this system, the nutrient solution must be propelled upward through the pipes to the horizontal pipes in order for it to reach the spraying wands. The fact the pump must propel the nutrient solution upward posses a significant limitation on the height of the apparatus and the number of plants that can be grown at one time. This feature poses a problem since the height of the apparatus, and thereby the number of plants that can be grown, is directly related to the power of the pump. The weaker the pump the shorter the vertical pipes and the fewer plants can be grown. However, since Applicant's invention utilizes gravity to create the pressure necessary to mist, fog, or spray the exposed root mass, it does not require expensive high pressure pumps.

FIG. 1 illustrates a commercial aeroponic growth and development system, which comprises a reservoir 10, a pump 20, a timer 25, a power supply 30, and a conical tower 60 comprising a first end and second end, wherein the first end is atmospherically sealed and the second end is coupled to the reservoir 10.

Figure 2:
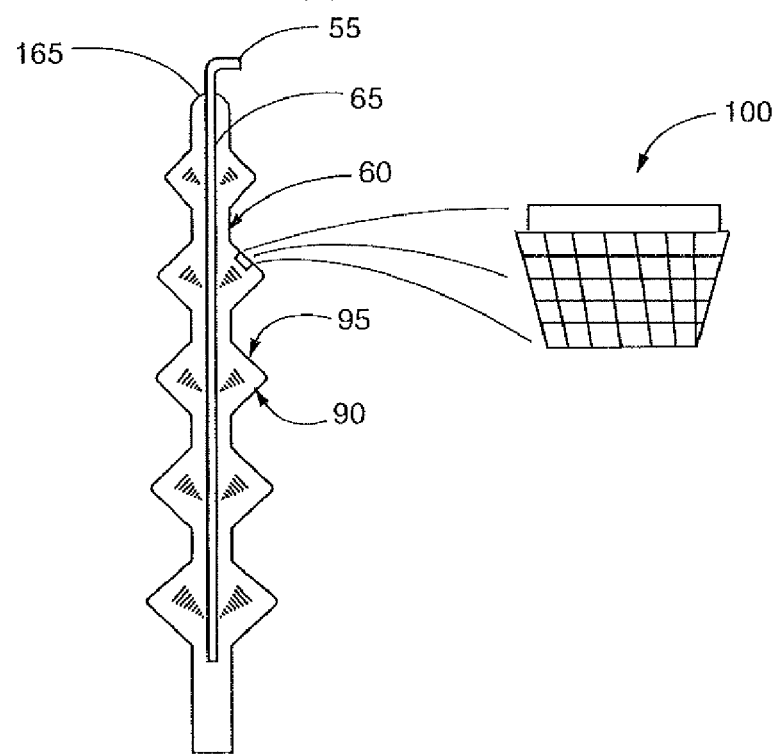
FIG. 2 illustrates an aeroponic growing tower constructed in accordance with the invention.

Referring to FIG. 2, the conical tower 60 includes an upper portion having an opening 165 that is atmospherically sealed by a distribution pipe 65 extending through opening 165 of the conical tower 60. Other than the opening 165 in the upper portion for the distribution pipe 65, the under portion is atmospherically sealed to prevent any unnecessary evaporation or seepage of liquid nutrient solution, as referred to in FIG. 3 (75).

In addition to having a sealed upper portion through which the distribution pipe 65 is located, the conical tower 60 has at least one panel 95 extending outward and downward containing at least one opening adapted to retain a seed container 100. Connecting this downward and outward sloping panel 95 to the conical tower 60 is another panel 90 extending downward and inward from the end of the outward sloping panel 95, forming a plant support 140. The panels extending downward and outward 95 connecting with those extending downward and inward 90 run circumferentially around the conical tower 60 to form a plurality of plant supports 140 as seen on FIG. 1.

Referring back to FIG. 1, in the preferred embodiment of the invention, the upper panel 95 of plant support 140 slopes outward (substantially away from the axis of conical tower 60) and downward (towards the second end) from tower 60 and the lower panel 90 connecting with the upper panel 95 slopes inward (substantially towards the axis of conical tower 60) and downward from upper panel 95 to conical tower 60. The upper panel 95 contains at least one opening 115 at circumferentially spaced points around the conical tower 60 adapted to retain the seed container, as referred to in FIG. 2 (100), for supporting a plant, seed, or starter media. The seed container, as referred to in FIG. 2 (100) comprises holes, a mesh, a basket, or the like, which maintains the plant, seed, or starter media.

Each conical tower 60 is provided with at least one plant support 140. In a preferred non-limiting embodiment, a plurality of plant supports 140a-140e are disposed along conical tower 60. One issue with vertically stacked plant supports is that an uppermost plant support 140a may block the light shining down on conical tower 60 from the lower plant supports 140b-140e, and so on in descending order; i.e., plant support 140b also blocks light to plant support 140c, etc. Furthermore, as plants grow within openings 115 and branch and leaf, they further interfere with plants growing in openings 115 in plant supports that are disposed along conical tower 60 at a position closer to the second end of conical tower 60 than the plant causing the shade.

Figure 5:
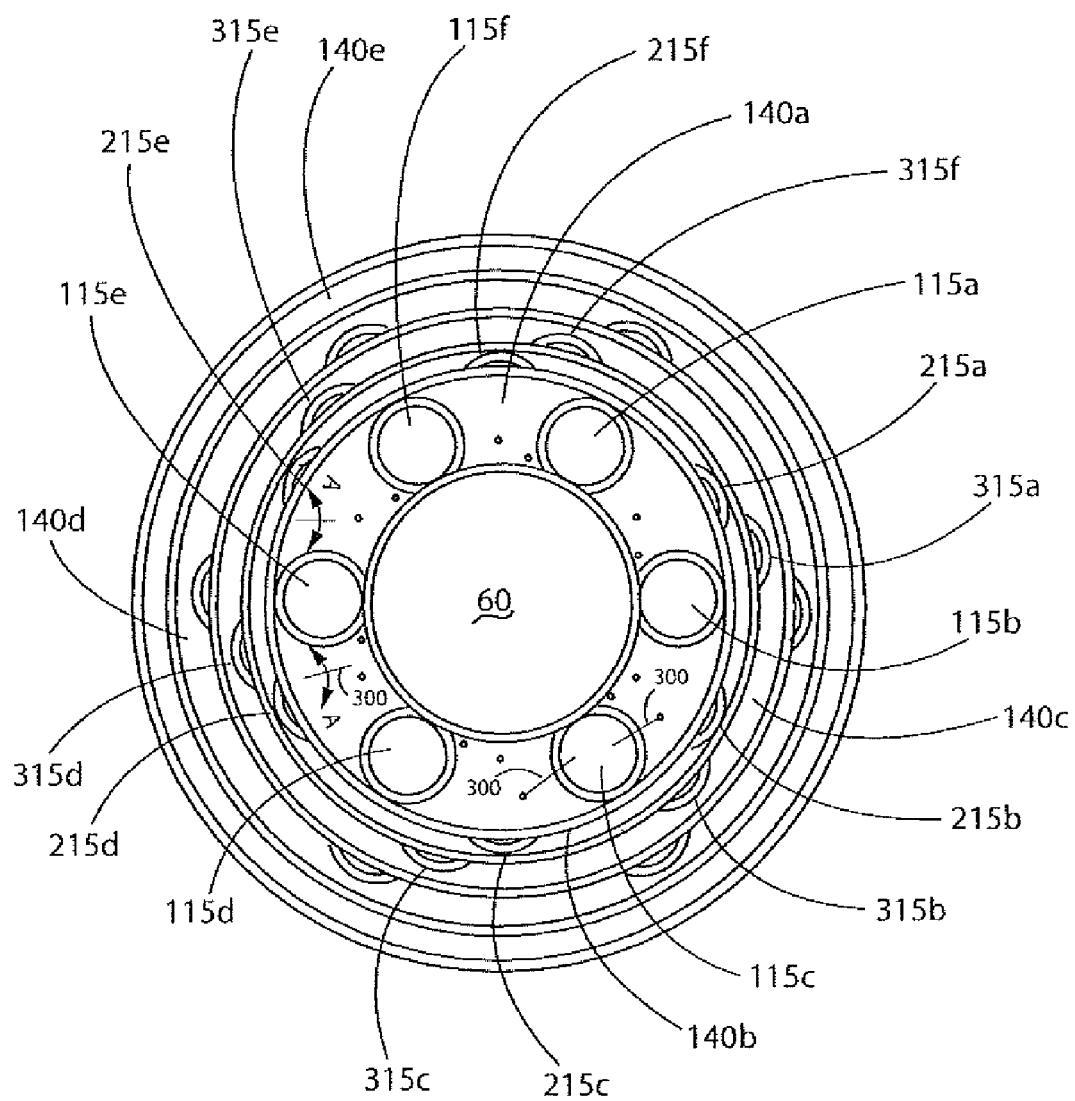
FIG. 5 is a plan view of an aeroponic growing tower constructed in accordance with the invention.

Reference is now made to FIGS. 2 and 5 in which structures for reducing the sun blocking effects are shown. The diameter of support 140 increases the closer it is disposed to second end of conical tower 60. As such, the diameter of plant support 140a is less than the diameter of plant support 140b which has a diameter less than the diameter of plant support 140c, which in turn has a diameter less than the diameter of plant support 140d, which in turn has a diameter less than the diameter of plant support 140e. In other words, in a preferred, but non-limiting embodiment of the invention, where a first plant support 140a is adjacent to a second plant support 140b, the plant support 140 being closer to the second end of conical tower 60 would have a second diameter greater than the first diameter of plant support 140a relatively closer to the first end of conical tower 60.

Additionally as is seen more clearly in FIG. 5, each plant support 140a-140e is provided with at least one opening 115 and preferably a plurality of spaced openings 115a-115f. The positioning of openings 115a-115f of a first plant support 140a is offset relative to positioning of openings 215a-215f of an adjacent plant support 140b. In other words, all plant supports 140 are coaxial about conical tower 60. Adjacent plant supports 140 are rotated a predetermined number of degrees about the axis of conical tower 60 relative to each other, such that openings 115e of adjacent plant supports are not coaxial with any other opening 115 on the adjacent plant support. They are offset from each other so as not to be coaxial, i.e., are rotated relative to each other about the axis of conical tower 60. In this way, as plants grow from respective openings 115, they do not interfere with a plant growing in a plant 140 support directly beneath, i.e., closer to second end of tower 60.

As plants grow, the mass shifts from the root structure to the branch and leaf structure; the portion of a plant extending from the opening 115, above top panel 95. Top panel 95 is not parallel to the ground when in use. Accordingly, gravity acts to pull leaves and branches toward the ground, rather than towards the roots in seed container 100. As a result, plants tend to tip from opening 115 as the mass exposed above panel 95 becomes significantly greater than the mass below panel 95, "tipping" the plant and the seed container 100 from opening 95.

In a preferred, but non-limiting embodiment, a locking device, such as anchors, is provided at each opening 115. As seen more particularly in FIG. 5, at least one anchor 300 is pivotably mounted to panel 95, adjacent a respective opening 115. In a preferred, but non-limiting embodiment, anchors 300 are formed as bars pivotably mounted to panel 95, capable of moving in both directions of double headed arrow A between a first position extending across opening 115 to maintain seed container 100 in place and a second position away from opening 115. In an even more preferred embodiment, anchors 300 may be provided in tandem, i.e., on opposed sides of an opening 115. A bar is shown by way of example only; wing nuts, slideable covers, or any other structure capable of being rotatable between a position at least partially covering opening 115 and a second position away from opening 115 may be used.

Figure 3:
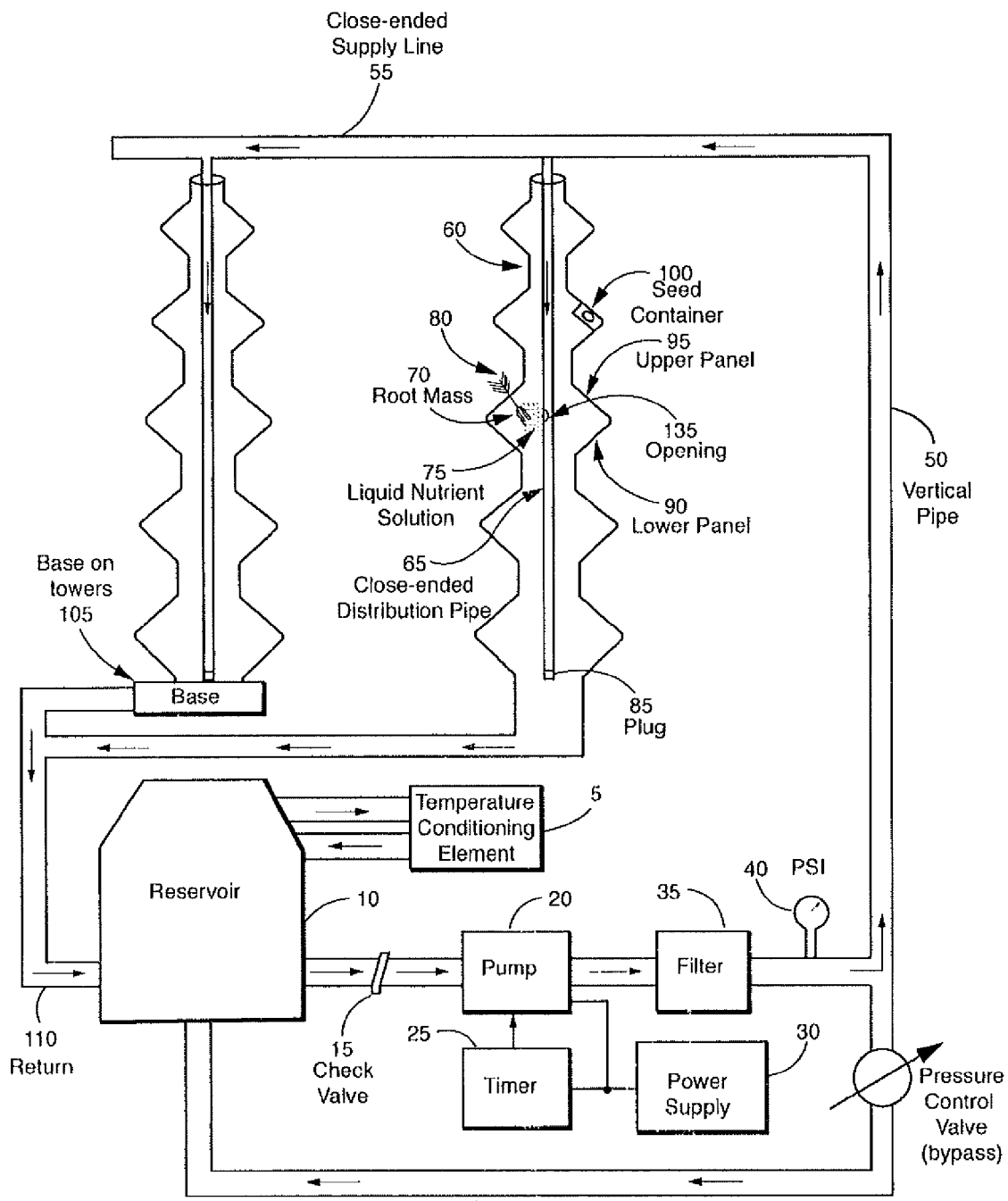
FIG. 3 is a schematic diagram showing operation of the aeroponic system constructed in accordance with the invention.

Referring to FIG. 3, the present aeroponic apparatus utilizes a timer 25, which controls the pump 20. The pump 20 provides for the delivery of the liquid nutrient solution 75 used in the present aeroponic system. The power supply 30 utilized to power the aeroponic system can be an alternating current (AC) system of 120 volts alternating current (VAC) or a direct current (DC) system of 12 volts direct current (VDC).

Figure 4:
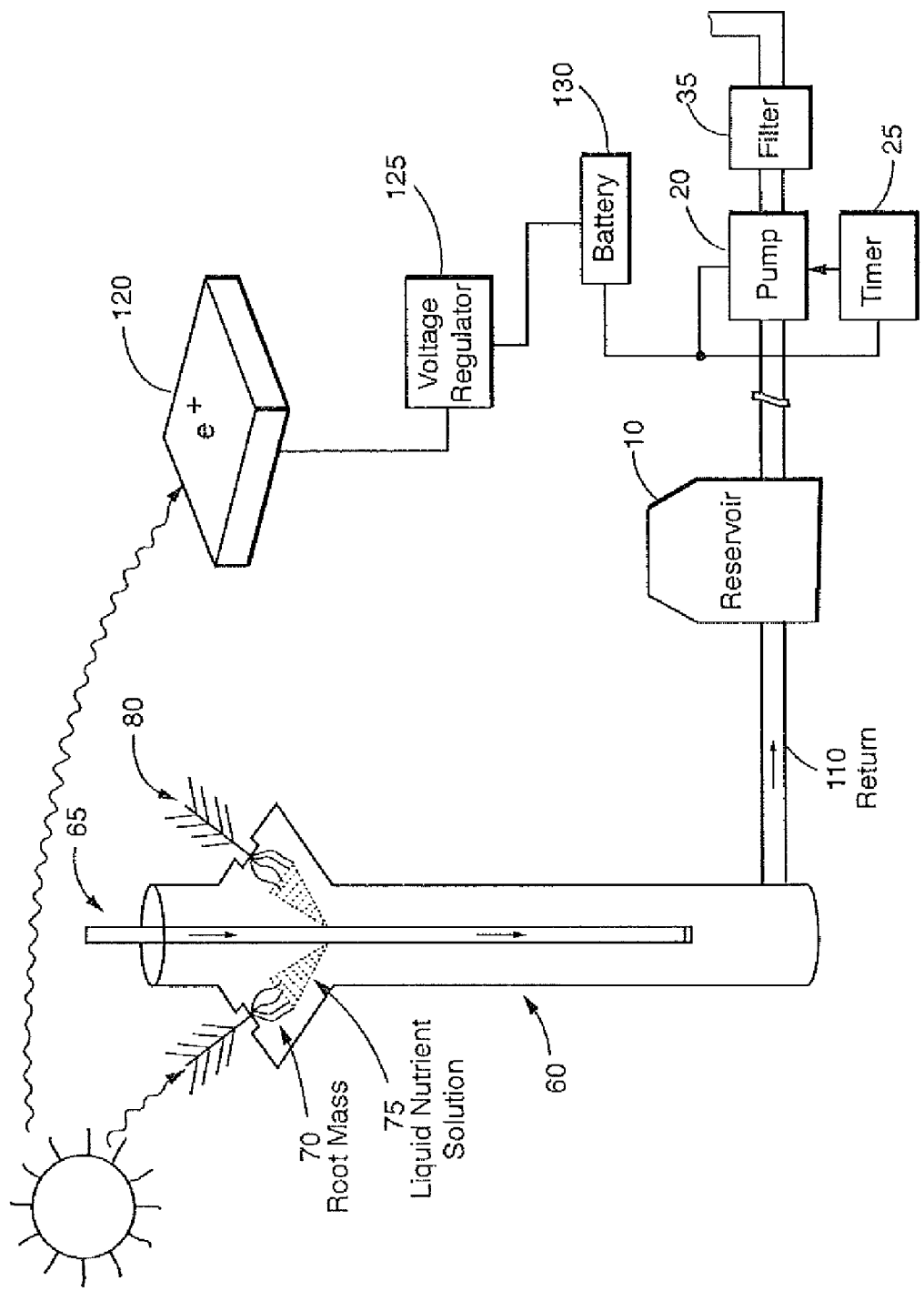
FIG. 4 is a schematic representation of a growing tower constructed in accordance with the invention.

Referring to FIG. 4, the alternating or direct current can be derived from solar energy or wind power. To be adapted to work with alternative forms of energy such as solar power, a solar panel 120, a voltage regulator 125, and the battery 130 should be utilized to provide the necessary energy for the pump 20 and the timer 25. As used herein, the term "liquid nutrient solution" refers to a liquid which contains nutrients in the solution or in the mixture.

Referring to FIG. 3, while there are various intervals at which to set the timer 25, the preferred interval is one (1) minute on and five (5) minutes off. According to an alternative embodiment of the invention, the temperature of the nutrient solution can be maintained through the use of a temperature conditioning element 5, which can be separate and apart from the reservoir 10, such as a chiller or a heater coupled to the power supply 30, or can be located within the reservoir 10, such as an ice-pack. The pH levels, temperature and the nutrients contained in the solution can be controlled inside the reservoir with a digital meter.

The pump 20, coupled to the reservoir 10, pushes the liquid nutrient solution 75 upward (in the direction of the first end of conical tower 60) through a vertical pipe 50. As will be appreciated, in an alternative embodiment, the pipe coupling the vertical pipe to the reservoir may contain a filter 35, to remove the impurities in the liquid nutrient solution 75 and/or a check valve 15 to prevent the liquid nutrient solution 75 from flowing back into the reservoir 10. The pipe may also contain a pressure gauge 40. In accordance with the preferred embodiment of the invention, the liquid nutrient solution 75 is propelled upward through the vertical pipe 50, which may range from one (1) inches to three (3) inches in diameter or more. The use of a pipe with such a small diameter makes the apparatus more efficient by requiring less energy to propel the liquid nutrient solution 75 upward from the reservoir 10 to the distribution pipe(s) 65.

The liquid nutrient solution 75 is dispersed into the conical tower(s) 60 via the use of a close-ended supply line 55, which is coupled to at least one close ended distribution pipe 65, which can be at least half (½) an inch in diameter and runs downward through the middle of the conical tower 60. The close-ended distribution pipe 65 running downward through the middle of the conical tower 60 is sealed 85 at the opposite end and contains at least one opening per plant on its side 135 through which the liquid nutrient solution can be misted, fogged, or sprayed 75. The un-absorbed liquid nutrient solution is then collected in the base 105 at the second end and flows through the return 110 to the reservoir 10 to be reused.

Referring again to FIG. 3, in operation, the liquid nutrient solution is propelled upward through the vertical pipe 50 from the reservoir 10 by the pump 20. Once the liquid nutrient solution is transported propelled upward through the vertical pipe 50 to the closed ended supply line 55, gravity pulls the liquid nutrient solution downward through the close-ended distribution pipe 65. Since the distribution pipe 65 is sealed at the opposite end 85, the distribution pipe 65 fills with liquid nutrient solution. As the distribution pipe 65 fills with liquid nutrient solution, the pressure created from the downward flowing liquid nutrient solution causes the liquid nutrient solution to be expelled from the distribution pipe 65 via the opening(s) 135 in the distribution pipe 65.

The pressure created from the incoming liquid nutrient solution 75 into the distribution pipe 65 is sufficient to create a mist, fog, or spray of liquid nutrient solution 75 within the conical tower 60.

The preferred embodiment utilizes a distribution pipe 65 through the interior of conical tower 60. However, it is well within the scope of the invention for the distribution pipe to extend along the exterior of each conical tower 60 being coupled by hosing to each individual plant support 140 along conical tower 60. Each connecting hose from external distribution pipe 65 ending at least one spray head internal to plant support 140 adjacent at least one seed container 100.

Referring to FIG. 4, the seed container, as referred to in FIG. 2 (100), exposes the root mass 70 of the plant to the liquid nutrient solution 75 dispersed from the distribution pipe 65 and the atmosphere contained within the conical tower 60. The upper portion of the plant 80 is exposed to light, which can be artificial or natural. The disk like structure is intended to act as a drain for the liquid nutrient solution, which is not absorbed by the exposed root mass 70. The un-absorbed liquid nutrient solution is then accumulated in the base at the second end of conical tower 60, as referred to in FIG. 3 (105), coupled to the conical tower 60 and passes through the return 110 to the reservoir 10 to permit recycling and reuse of the unabsorbed liquid nutrient solution.

During operation, liquid nutrient solution 75 is sprayed toward the respective through openings 135 in the direction of respective seed containers 100 disposed at openings 115. Not all of the liquid nutrient is absorbed by the root mass 70 in seed container 100. As discussed above as a function of gravity liquid nutrition collects at the second end of conical tower 60. However, the liquid nutrient which is primarily water has a tendency to travel to base 105 along a surface as a result of the surface adhesion properties of water. Therefore, the surface adhesion property of a liquid nutrient acting under a force of gravity causes the unused liquid nutrient to travel along the interior surface of the respective plant support 140 and conical tower 60. In other words, the path of the nutrient as it falls would be along a bottom panel 90 downwards towards an adjacent wall of conical tower 60 to a top panel 95 of the next lower plant support 140.

However, when water comes in contact with an opening 115 and/or seed container 100, the flow path is broken and the liquid nutrient has a tendency to pool at any recess. The pooling of the liquid nutrient promotes algae growth which is detrimental to the overall operation of the system as it clogs the spray jets, ruins the aesthetics of the overall system, and fights with the desired plants for the sprayed liquid nutrient (much like a weed).

Figure 6:
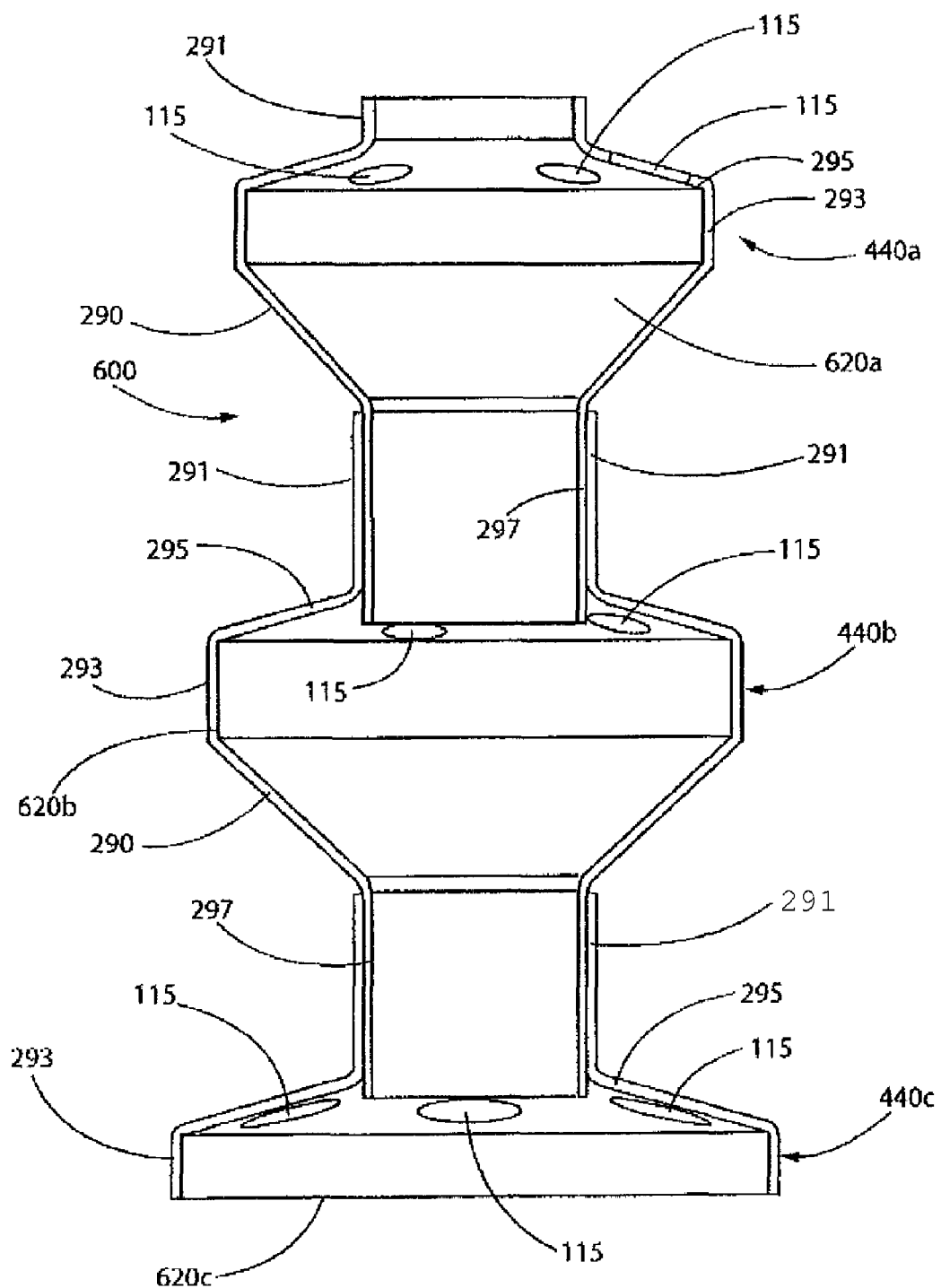
FIG. 6 is a sectional view of an aeroponic growing tower constructed in accordance with another embodiment of the invention.

Reference is now made to FIG. 6, wherein a tower, generally indicated as 600, constructed in accordance with another embodiment of the invention is provided. In this embodiment, each plant support is received in an adjacent plant support so that tower 600 is formed of stacked plant supports 440. Like numerals are utilized to indicate like structure to facilitate the description, plant support 440*b* is described as representative of each of plant supports 440*a*-440*c*, the only difference among the plant supports is a difference in diameter as discussed above.

Plant support 440*b* includes a conical wall 291. A body 620*b* includes a first panel 295 extending downward and away from conical wall 291. Body 620*b* includes a sidewall 293 extending substantially downward (in the direction of the second end of the tower 600) from an edge of panel 295. A lower panel 290, extends downward and inward (towards the axis of tower 600) from sidewall 293. Body 620*b* has an at least partially hollow interior to accommodate nutrient feeding and drainage therein. It should be known that body 620*b* may be of any shape which accommodates a seed container 100, and facilitates feeding and draining of liquid nutrient, and need not be of the disk like or triangular shaped discussed above. Of note, plant supports 440*a* and 440*c* can also include a conical wall 291, a body 620*a*, 620*c* with an upper panel 295, a sidewall 293, and a lower panel 290, as well a nutrient guide structure 297.

A nutrient guide structure 297 is in fluid communication with the interior body 620*b* and is provided to guide the nutrient along a path from lower panel 290 to a lower end of nutrient guide path 297. In a preferred embodiment, nutrient guide path 297 is a conical wall. However, a plurality of spaced pipes, string, or any other structure having a surface capable of conveying liquid nutrient may be used. Nutrient guide 297 changes the path of nutrient to avoid the upper panel 295 of an adjacent lower plant support 440*c*.

Circular wall 297 extends downward from panel 290 of body 620*b*. As with plant support 140, first panel 295 is provided with openings 115 disposed therein. Furthermore, in a preferred, but non-limiting embodiment, the length of second conical wall 297 is greater than the length of first conical wall 291. Furthermore, conical wall 297 has an outer diameter less than an inner diameter of first wall 291.

Because the outer diameter of conical wall 297 is less than the inner diameter of conical wall 291, first conical wall 291 receives and supports second conical wall 297 therein, so that a conical tower 600 may be constructed by nesting a plurality of plant supports 440*a*-440*c* within each other. Therefore, in a preferred embodiment, first conical wall 291 and second conical wall 297 are dimensioned to provide a tension fit between the inner surface of first conical wall 291 and the outer surface of second conical wall 297 sufficient to maintain plant supports 440*a*-440*b*, by way of example, connected during use but to allow separation or joining without more than the manual effort of an ordinary user. Furthermore, because the length of second conical wall 297 is greater than the length of first conical wall 291, the alternative nutrient path extends into the interior of the adjacent lower plant support 440*c* and the nutrient does not come in contact with upper panel 295 and therefore does not travel along the interior surface of plant support 440*c*. In this way, the liquid nutrients travel along the interior of conical tower 600, not the panels of adjacent plant supports, and does not pool except for at the second end (base 105) of tower 600 as desired.

Since it is the downward flow of the liquid nutrient solution 75 that creates the necessary pressure to mist, fog, or spray the exposed root mass 70, a more energy efficient pump is used to mist a greater number of plants. Due to the three dimensional agricultural growing space that is created through the implementation of the present invention, the number and variety of plants that can be grown using relatively little energy is virtually unlimited. This allows the present invention to be more energy efficient, cost effective, and environmentally friendly.

Thus, while there have been shown, described and pointed out novel features of the present invention as applied to preferred embodiments thereof, it would be understood that various omissions and substitutions and changes in the form and detail are contemplated for the disclosed invention and may be made by those skilled in the art without departing from the spirit and scope of the invention. It is the intention therefore, to be limited only as indicated by the scope of the claims appended hereto. It is also to be understood that the following claims are intended to cover all of the generic and specific features of the invention herein described and all statements of the scope of the invention which, as a matter of language, might be said to fall therein between.

What is claimed is:

1. A plant support for an aeroponic tower comprising:
   a body, the body having an upper panel, a lower panel, and at least one opening adapted to retain a seed container being formed in the upper panel;
   a conical wall extending from said upper panel away from the body and being in fluid communication with an interior of the body; and
   a liquid nutrient solution guide in fluid communication with the body and extending from the lower panel of the body.

2. The plant support of claim 1, wherein the conical wall has an inner diameter, and the liquid nutrient solution guide has an outer diameter, the inner diameter being greater than the outer diameter.

3. The plant support of claim 1, wherein said liquid nutrient solution guide is a second conical wall.

4. The plant support of claim 1, wherein the body further comprises a sidewall, the sidewall extends substantially downward from an edge of the upper panel and extends substantially upward from an edge of the lower panel.

5. The plant support of claim 1, wherein the body comprises at least a partially hollow interior.

6. The plant support of claim 1, further comprising a locking device pivotally mounted to the upper panel adjacent a respective at least one opening, the locking device being movable between a first position where the locking device extends at least partially across the at least one opening, and a second position where the locking device does not extend across the opening.

7. The plant support of claim 1, wherein the upper panel extends downward and outward from a center axis of an aeroponic tower and the lower panel extends downward and inward toward the center axis of the aeroponic tower.

8. A locking apparatus for a seed container in an aeroponic tower comprising:
   a body, the body having an upper panel and a lower panel and at least one opening adapted to retain a seed container being formed in the upper panel, the lower panel extending downward and inward toward a center axis of the aeroponic tower; and,
   a locking device pivotally mounted to the upper panel adjacent a respective at least one opening, the locking device being movable between a first position where the locking device extends at least partially across the at least one opening, and a second position where the locking device does not extend across the opening.

* * * * *